United States Patent [19]

Sanders, Jr. et al.

[11] 4,264,847

[45] Apr. 28, 1981

[54] SPEED CONTROL FOR A FOUR POLE MOTOR

[75] Inventors: John B. Sanders, Jr.; Robert P. Thrasher, Jr., both of Columbus, Miss.

[73] Assignee: Ambac Industries, Incorporated, Carle Place, N.Y.

[21] Appl. No.: 50,420

[22] Filed: Jun. 20, 1979

[51] Int. Cl.$^3$ .............................................. H02P 7/08
[52] U.S. Cl. .................................. 318/349; 310/151; 310/197; 318/340; 318/361; 318/514; 318/541
[58] Field of Search ............... 318/340, 361, 541, 542, 318/349, 139, 305, 360, 495–502, 514–516; 310/197, 151, 137, 139, 140, 144, 145

[56] References Cited

U.S. PATENT DOCUMENTS

| | | | |
|---|---|---|---|
| 711,667 | 10/1902 | Lundell | 318/139 |
| 971,199 | 9/1910 | Janisch | 318/139 |
| 1,003,431 | 9/1911 | Churchward | 318/139 |
| 1,366,984 | 2/1921 | Weichsel | 318/340 |
| 2,472,646 | 6/1949 | Cochran | 318/139 |
| 2,625,674 | 1/1953 | Petit | 310/197 |

*Primary Examiner*—David Smith, Jr.
*Attorney, Agent, or Firm*—John C. Dorfman

[57] ABSTRACT

A four pole d.c. motor speed control is provided by connecting two of the opposed brushes together to ground and the intermediate brushes to separate terminals of a switch means which in energized positions connects a grounded power supply to at least one of the brushes. The switch means supplies various combinations including direct connection of the power supply to one or both of the brushes. Connection of the power supply through resistance means, connection of the other brush to provide a closed circuit across the windings or to provide a resistance in series with those windings.

10 Claims, 5 Drawing Figures

SPEED CONTROL FOR A FOUR POLE MOTOR

The present invention relates to a speed control system for a direct current motor of at least four poles. More specifically, it relates to switch means which connect a constant d.c. power source and various circuit elements in various connections of the armature windings of the motor which enable the motor to operate at different speeds.

One advantage of a direct current motor is that it lends itself to speed control. Certain problems exist in connection with speed control of direct current motors varying from loss of efficiency, to major reductions in torque, to the possibility that certain types of motors may "run away".

Motors having four or more poles offer special problems with regard to control circuitry. In accordance with the present invention, the problems are largely turned to advantage. The present invention offers a very simple switching arrangement with a very limited number of circuit elements in order to achieve simply and inexpensively even a relatively high number of circuit combinations to achieve different speeds.

More specifically, the present invention relates to a speed control system for direct current motors of at least four poles wherein the motor consists of a frame, a field on the frame, a rotatable armature having windings and a commutator employing a plurality of segments with which the brushes make electrical contact.

The frame and the field on the frame are conventional but may be of wound or permanent magnet types, preferably the field is wound with uniform distribution, where wound configurations are employed. The winding of the armature is also one which is preferably uniform in its distribution and provided with successive commutator segments successively changing the points of winding connection so that the magnetic effect of the armature winding is repetitive for different winding portions as successive commutator segments are contacted by the brushes. The brushes on the frame are essentially 90° apart such that the winding distribution between each pair of segments contacting adjacent brushes produces a symmetrical field around the armature. Connection means connect two of the opposed brushes to a common ground connection for power supply and the intermediate opposed brushes to separate terminals. Switch means having separate input connections for said separate terminals and an output connection for a power supply provides means whereby various selectable combinations of connections are made from one or both of the separate terminals to the power supply.

The switch and circuit connections may be relatively simple or they may become relatively complex depending upon the particular circuit selected.

The advantage of the present invention lies, in fact, that two of the brushes are connected together to a fixed potential which, in turn, is connected to the power supply or a ground and a switch interconnects the other two brush terminals and the power supply.

For a better understanding of the present invention, reference is made to the accompanying drawings in which.

Figure 1:
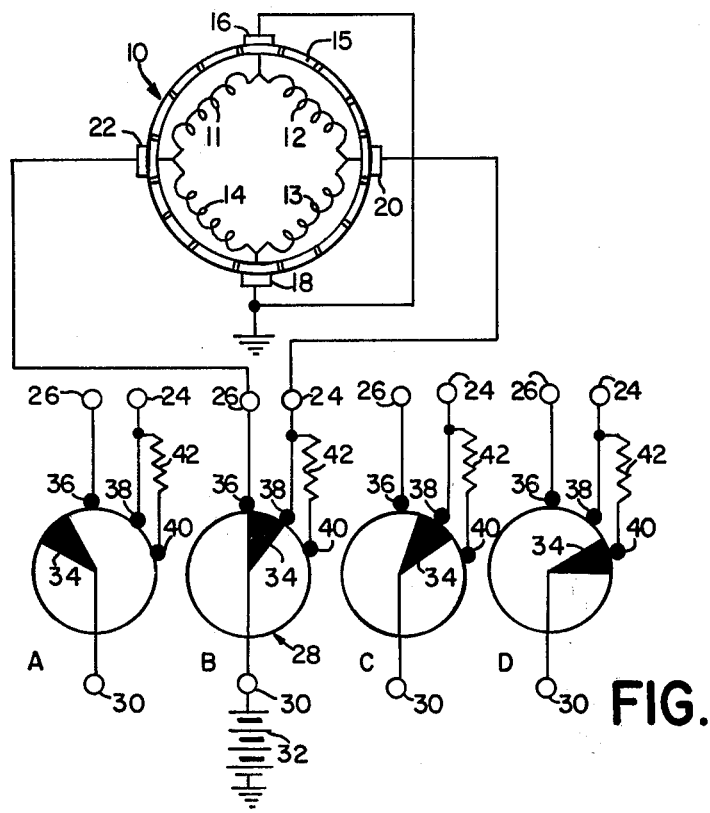
FIG. 1 shows a circuit diagram of the switch and circuit of the present invention and a four-pole motor in combination with a power supply with alternative switch positions being shown.

Referring first to a FIG. 1, perhaps the simplest form of the present invention is illustrated. A four-pole d.c. motor 10 has its armature winding divided into four sections 11, 12, 13 and 14 which are connected to successive commutator bars 15. The connections to the commutator bars is shown only for the four commutator segments presently contacted by brushes 16, 18, 20 and 22. It will be understood that the other commutator segments are connected to the windings at intermediate points and that the winding connections between the various commutator segments are arranged to be balanced. As a consequence, the magnetic field produced by winding segments between brushes is constantly shifting as brushes move to adjacent commutator segments. Not shown is the fixed frame and the field which may be permanent magnet pole pieces, or stator windings each of which, however, are conventional and well known. In this particular embodiment, brushes 16 and 18, which are connected together, are also connected to ground. In accordance with the present invention, an opposed pair of brushes such as 16 and 18 are always connected to a constant potential. Brushes 20 and 22, by contrast, are connected, respectively, to terminals 24 and 26 of a switch 28. The other external terminal 30 of switch 28 is connected to d.c. power supply 32, which, in turn, is connected to ground. It will be understood that brushes 16 and 18 could be likewise connected to an elevated potential and ground, for example, could be attached to terminal 30 as well as the battery. Terminal 30 is connected to a switch rotor 34 whose position can be changed and which consists of a metallic bridge element which can contact no more than two of the three contacts 36, 38 and 40 at one time. Contact 36 is connected directly to terminal 26 of the switch. Contacts 38 and 40 are connected to terminal 24 of the switch but with contact 38 being connected to terminal 24 and with a resistor 42 interposed in the connection between contact 40 and terminal 24.

The switch is redrawn with its rotor 34 in four alternative positions, and it will be understood that these represent the different speed selection positions for the rotor. In the drawing, only position B is connected into the circuit, but it will be understood that each of the positions, A, C and D, is intended to be substituted and visualized in the place of the structure in position B. Thus, it will be seen that in the position A, or any position in which the rotor 34 does not contact one of the contacts 36, 38 and 40, the motor will not operate and there will be no speed. In the position B, which is shown connected into the circuit, the rotor 34 connects together the terminals 36 and 38 so that effectively the brushes 22 and 20, like brushes 16 and 18, are connected together and to the other side of power source 32. The winding segments 11, 12, 13 and 14 are all connected across the same potential. In position B maximum speed is achieved. In position C of the rotor, terminal 38 alone is contacted and through switch terminal 24 brush 20 is contacted so that in this instance only windings 12 and 13 have the same potential applied across them, and 11 and 14 have no potential applied. Thus, only half of the parallel circuit is provided, the ampere turns driving the motor are reduced and motor speed is reduced.

A further reduction in ampere turn occurs by interposing the resistance 42 in series with the same two windings 12 and 13 when the rotor is in switch position D contacting contact 40. Thus, the current flowing through the same two windings is much reduced and the ampere turns is reduced and the speed reduced.

Figure 2:
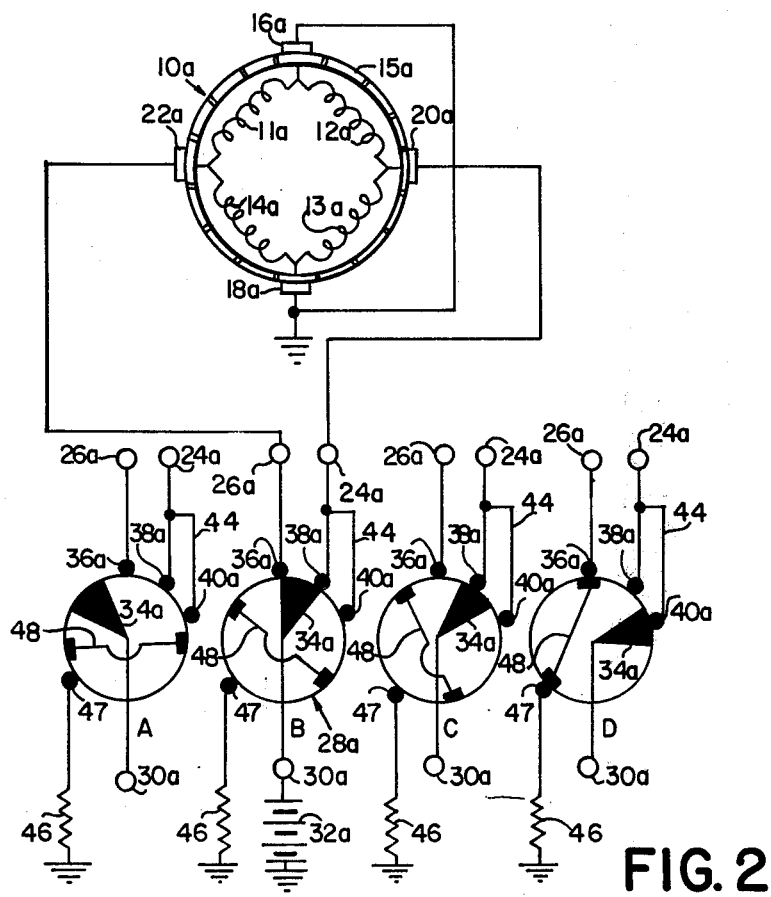
FIG. 2 is similar to FIG. 1 but shows a circuit parallel to the power supply.

A second variation of the four-pole d.c. motor switch configuration is shown in FIG. 2. In this Figure, parts corresponding to those in FIG. 1 retain the same numbers with addition of a suffix "a" from which it will apparent that the changes involved are permanently within the switch structure, or at least within the terminals 24a, 26a and 30a. Specifically, resistance 42 is omitted from the path 34 so that terminals 38a and 40a are effectively connected together. A resistance 46 is connected between a contact 47 and ground. The circuit of the switch itself is further complicated by the necessity to provide an additional circuit shown as connector 48 apart from the rotor 34a. Circuit switching may be mechanically accomplished by one of several options such as the use of a gang switch. The drawing of the switches in each of the following Figures is intended merely as schematic representations of switch circuit requiurements each of which may be provided by known techniques.

Switch positions are shown in capital letters. Switch position A represents the off position of the rotor 34a.

Position B corresponds to position B of FIG. 1 whereby each of the windings 11a, 12a, 13a and 14a is connected across the power source with the ground being connected to brushes 16a and 18a as in FIG. 1 and full potential being applied to brushes 20a and 22a.

When the switch rotor is moved to position C so that instead of contacting both contacts 36a and 38a, the rotor wiper 34a contacts only contact 38a, potential is applied only across windings 12a and 13a. The speed of the motor is thereby reduced.

In switch position D, the rotor wiper 34 contacts only contact 40a which is connected directly to terminal 24a so that the same potential is applied across windings 12a and 13a as in position switch C. However, conductive bridge 48 is positioned to connect terminals 47 and 36a and thereby put the resistance 46 in series with brush 22a through switch terminal 26a. Currents are generated in this circuit causing a sort of dynamic braking opposing the motor action of winds 12a and 13a which, therefore, slows the motor. Thus, the winds 11a and 14a are connected in a circuit through resistance 46.

Figure 3:
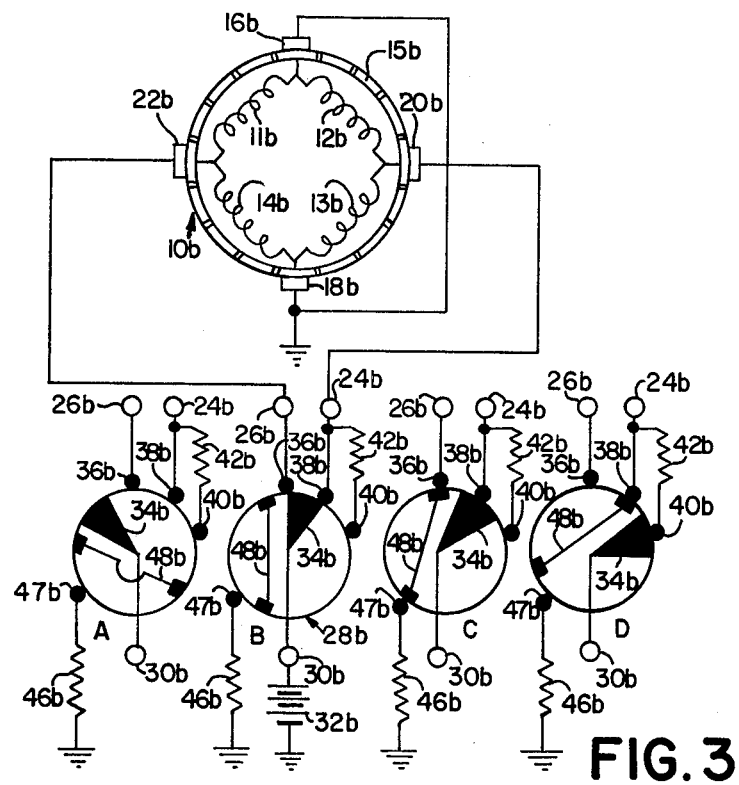
FIG. 3 is a system similar to FIG. 2 but combining circuit features of FIG. 1 and FIG. 2.

The switching combinations of FIG. 3 represent a composite or combination of the systems of FIGS. 1 and 2. In FIG. 3, the numbers correspondings to those in FIGS. 1 and 2 are given the same number designator but with a suffix "b". The resistor 42b replaces the low resistance bypass 44 of FIG. 2. Again, the switch rotor has four operatable pistons wherein the rotor 34b and the bridge connector 48b are rotated together and assume switch positions A, B, C and D.

In position A all of the windings are disconnected from the power source 32b. Only in position B are all of the windings shown connected into the total circuit. The B position, as in the other systems, connects the power supply 32b through rotor 34b to terminals 36b and 38b and switch terminals 26b and 24b, thence, to brushes 22b and 20b applying full potential to these brushes. Brushes 16b and 18b are connected together and to ground as is the other circuits thereby completing the circuit through power supply 32b. In position B, full potential across all windings drives the armature at maximum speed.

With the switch in position C , brush 20b is connected to power supply 32 through the switch rotor 34b contacting fixed contact 38b. The bridge connector 48b connects together contacts 47b and 36b and thereby connects brush 22b to ground through resistor 46b, providing an effective circuit path via ground through resistor 46b for each of the windings 11b and 14b. Again, induced generator action in these windings oppose motor action in the other windings. Speed is thereby substantially reduced.

A little less speed is produced with the switch in position D as compared to position C providing the resistance of 42b is made to be higher than 46b. In position D, the brush 22 is disconnected in view of the fact that there is no connection to terminal 36b. The bridge connection 48b completes no connection even though it is contact with terminal 38b. However, rotor 34b contacts terminal 40b so that current flows through resistor 42b and less than full potential is applied across the windings 12b and 13b from brush 20b to brushes 16b and 18b, respectively. Somewhat less than full is applied across both the windings 12b and 13b because of the drop through a resistance 42b. Again, no circuit connection is made including windings 11b and 14b. Thus, the speed is reduced over what it would be with full potential across the windings 12b and 13b, but it may be higher or lower than the speed selected in position C depending upon resistance value.

Figure 4:
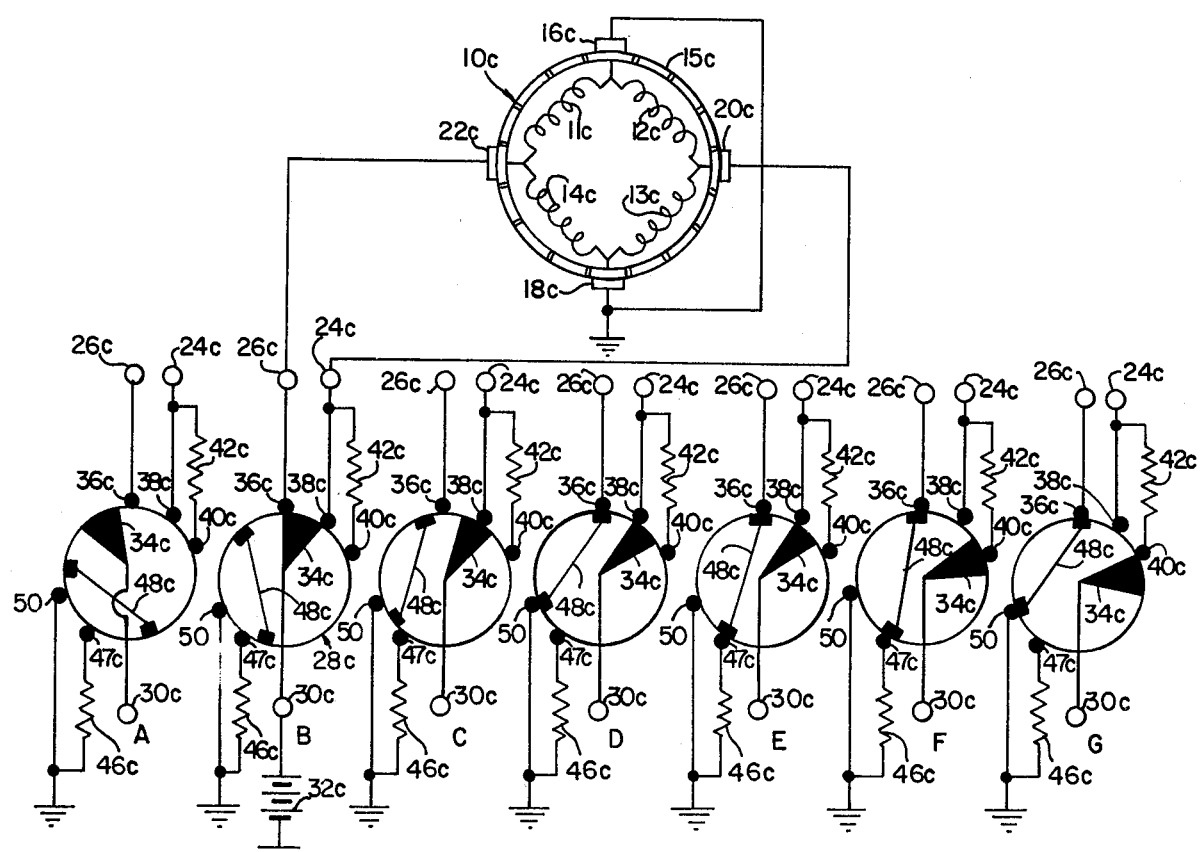
FIG. 4 is a further extension of the circuit of FIGS. 1 to 3 involving further parallel alternative circuits to provide additional switch combinations.

Referring now to FIG. 4, an arrangement is shown having one off and six operating switch positions providing different speeds for the motor. However, in order to accomplish the switching circuit shown, a bridge connection 48c must be of provided. Also, an additional internal stationary contact 50, which is directly connected at ground instead of through resistor 46c as contact 47c is, is provided on the switch. In position A, there is no connection of the armature windings to the power supply 32c. The B position of the switch represents the maximum speed and, as in other circuits, maximum speed is achieved by applying the full voltage of the power supply across each of the four windings by connecting each of the brushes 20c and 22c to the power supply, brushes 16c and 18c being connected permanently to ground.

In position C, the rotor 34c connects only contact 38c to the power supply 32c so that only brush 20b is connected thereto and power is applied only across windings 12c and 13c.

In position D of the switch, the rotor 34c still connects contact 38c so that windings 12c and 13c remain connected across the power supply. At the same time the bridge connector 48c is positioned to connect contacts 50 and 36c whereby the brush 22c is connected through terminal 26c to ground.

In position E, the rotor 34c remains connected to contact 38c, but the bridge connector 48c is moved so that, while it remains in contact with contact 36c, now contacts 47c connects resistance 46c in series with the brush 22 and each of the windings 11b and 14b.

In switch position F, the connector 48c remains in the position of position E connecting the resistance 46c in series with the parallel windings 11c and 14c. The rotor 34c, however, is moved to a position whereby it contacts contact 40c thereby putting resistance 46c in series with the power supply 32c and the parallel windings 12c and 13c.

Finally, in position G, the rotor 34c remains in contact with contact 40c so that resistance 42 stays in series with the power supply and the parallel windings 12c and 13c. The bridge connector 48c, however, is moved so that it now connects contacts 36c and 50c, thus effectively connecting both windings 11c and 14c in a short circuit connection in which only their internal resistance limits the generator current induced in them. This current effectively procedures forces opposing the motor forces of windings 12c and 13c.

Figure 5:
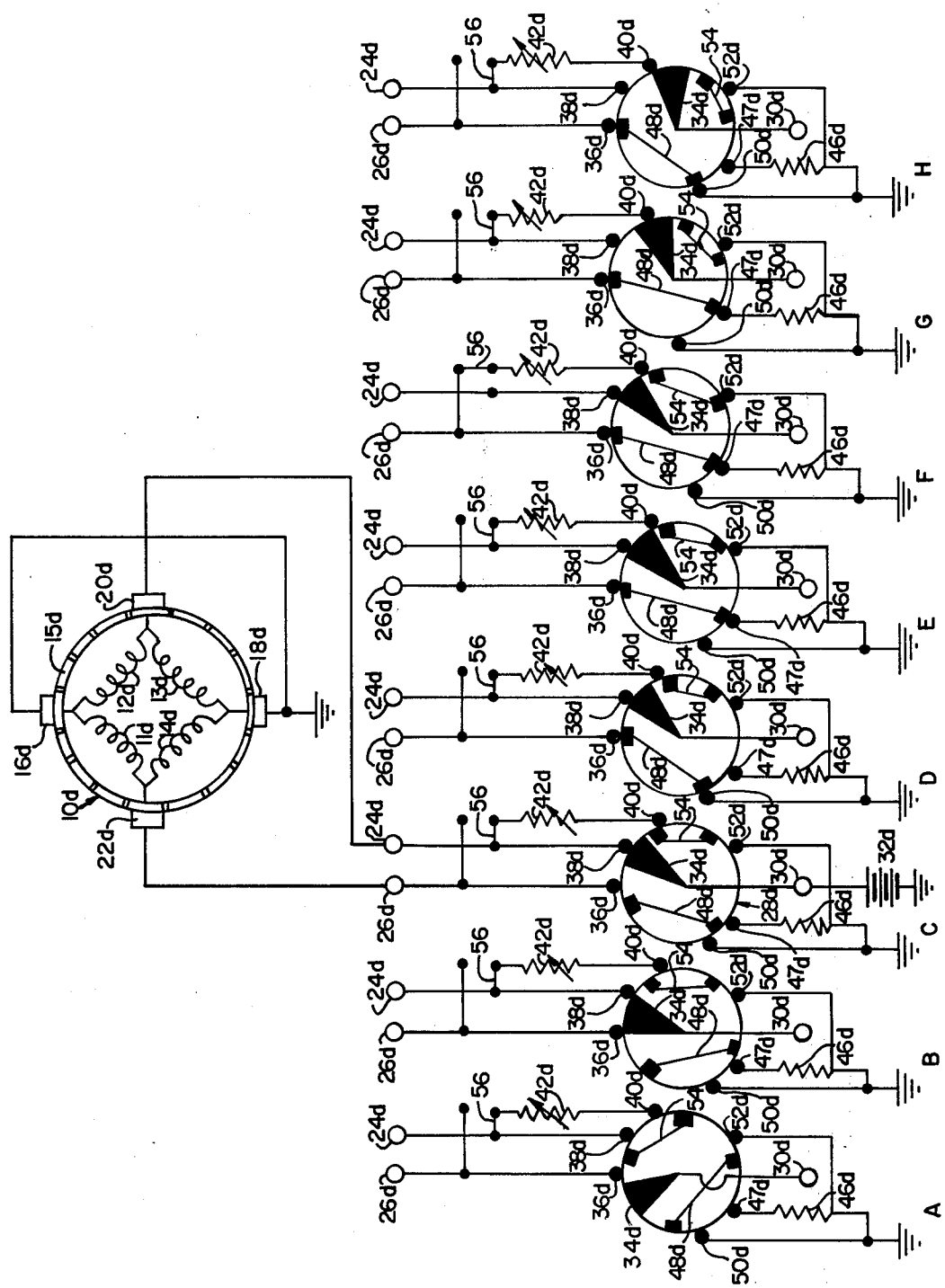
FIG. 5 is a similar diagram showing an even more complex circuit involving still more switch positions.

Finally looking at FIG. 5, an even more elaborate switch combinations are provided. This switch 28d provides an additional contact 52d which, like contact 50d, is connected to ground. In addition to the bridge connector 48d there is a second bridge connector 54 within the inward switch 28d. There is also an additional switch 56 which assumes alternate positions connecting resistor 42d to terminal 24d or terminal 26d through intermediate switch contacts. Preferably, switch 56 is mechanically connected to or is an integral part of the switch schematically represented by 28d.

As in previous embodiment, the A position of the switch involves an arrangement whereby none of the contacts are connected, and the motor is therefore disconnected and not energized.

In position B, as in prior cases, the rotor 34d connects the power supply 32d through the contacts 36d and 38d to the brushes 22d and 20d, respectively, whereby power is applied across all of the windings 11d, 12d, 13d and 14d and maximum speed is derived.

In position C, only windings 12d and 13d are connected across the power supply applied through switch rotor 34d and contact 38d to terminal 24d to brush 20d and ground through brushes 16d and 18d. Thus, speed is greatly reduced.

In switch position D, the same connection is maintained as in position C, but in addition, terminal 26d and hence brush 22d, is connected to ground by bridge connector 48d through contacts 36d and 50d. The circuit thus completed permits an inductive generator effect to be induced within the windings 11d and 14d opposed to the driving effect of the other windings and speed is further reduced.

In switch position E, the same circuits are maintained but current limiting resistor 46d is put into the path of windings 11d and 14d by the movement of the position of bridge connector 48d on contacts 36d and 48d so that instead of having the winding simply shorted through ground, their circulating currents must pass through current limiting resistance 46d, and their induced effect opposing motor action is reduced.

In switch position F, the circuit is modified by the connection of bridge connector 54 across contacts 40d and 52d. In addition, the external switch 56 has its position changed so that resistance 42d is connected to terminal 26d and, hence, to brush 22d rather than to brush 20d, as it is in all other circuit positions shown. Thus, as shown, there are two resistors 42d and 46d connected in parallel and, in turn, series connected with the parallel connected windings 11d and 14d in circuits which relay upon inductive coupling to the active windings 12d and 13d connected across power for energy effects.

In switch position G, the rotor 34d is moved into contact 40d. Switch 56 is returned to that position in which contact 40d and resistance 42d are connected to switch terminal 24d and, hence, to brush 20d. Thus, resistance 42d is connected in series with power supply 32d across the parallel windings 12d and 13d thus reducing driving current through windings 12d and 13d. At the same time, bridge connection 54 is moved to eliminate any interconnection of contacts and bridge connection 48d remains in position across contacts 48d and 36d so that resistor 46d remains connected to brush 22d. Therefore, windings 11d and 14d in parallel are connected in series with generator effect induced current limiting resistance 46d in a closed circuit through ground.

Switch position H leaves the rotor 34d maintaining the same connections as in switch position G and moves the bridge connector 48d so that it connects contacts 50d and 36d, thereby connecting brush 22 as well as brushes 16 and 18 directly to ground. Therefore, the windings 11d and 14d are effectively short circuited through ground without any current limiting resistance in their circuit and the opposing effect of their induced current is increased.

It will be observed that resistor 42d in this version is made variable, thus adding the facility of current adjustment through a wide range. Resistor 46d could also or alternatively be made adjustable for the purpose of an infinite variation of current within its range of resistances in the generator action circuit. It is further anticipated that resistance 42 in FIG. 1, 46 in FIG. 2 and resistance corresponding to 42 and 46 in FIGS. 3 and 4 could also be made variable.

The above variations in switch circuit arrangements for motor control offer a wide variety of simply switching techniques for adjusting motor speed. The switch itself and the switch circuit provide a much simpler arrangement than has been available in the prior art for adjusting four and more pole d.c. motor speed. Although various possible systems have been suggested, others will occur to those skilled in the art. Modifications employing the switching techniques disclosed in the present invention within the scope of the claims are intended to be within the scope and spirit of the present invention.

We claim:

1. A speed control system for a direct current motor of at least four poles, comprising:
   a frame;
   a field on the frame;
   an armature rotatable relative to the frame having windings and a commutator employing a plurality of segments connected to the windings;
   brushes on the frame electrically contacting commutator segments sequentially such that the winding distribution between each pair of segments contacting adjacent brushes produces a symmetrical field around the armature at least when all winding segments between the brushes are equally energized;
   connection means connecting at least two of the opposed brushes to a common power supply connection and connecting the intermediate brushes to separate terminals; and
   switch means having separate input connections from said separate terminals and an output connection for power supply, said switch means providing various selectable combinations of connections from one or both of said separate terminals to power supply connection.

2. The speed control system of claim 1 in which the switch means provides at least the alternatives of complete disconnection of the windings in parallel and a further combination of only a part of the windings across the power supply.

3. The speed control system of claim 2 in which a further alternative is provided of placing a resistance in series with the windings connected across the power supply.

4. The speed control system of claim 3 in which the resistance placed in series with windings across the power supply is made variable.

5. The speed control system of claim 2 in which means is provided to connect other winding segments in a closed circuit which does not include the power supply.

6. The speed control means of claim 5 in which circuit closing means includes an alternative of a connection of the winding segments and to end so that they rely only on their internal resistance for current limiting.

7. The speed control system of claim 5 in which the circuit closing means includes resistance means in series to limit current through the windings not in series with the power supply.

8. The speed control system of claim 6 in which an alternative circuit connection is provided to include resistance in series with the winding segments.

9. The speed control system of claim 8 in which the included resistance is variable in order to vary the current flowing through the circuits including winding sections but no power supply means.

10. The speed control system for a direct current motor in which the motor is limited to four poles and the brushes are located approximately 90° apart with one pair of opposed brushes being connected to ground and the power supply is also grounded.

* * * * *